United States Patent
Lace

(10) Patent No.: US 8,235,646 B2
(45) Date of Patent: Aug. 7, 2012

(54) AEROENGINE NOZZLE

(75) Inventor: Brian R. Lace, Derby (GB)

(73) Assignee: Rolls-Royce PLC, London (GB)

( * ) Notice: Subject to any disclaimer, the term of this patent is extended or adjusted under 35 U.S.C. 154(b) by 1227 days.

(21) Appl. No.: 11/889,738

(22) Filed: Aug. 16, 2007

(65) Prior Publication Data

US 2008/0069687 A1 Mar. 20, 2008

(30) Foreign Application Priority Data

Sep. 14, 2006 (GB) .................................. 0618072.3

(51) Int. Cl.
*F01D 17/14* (2006.01)

(52) U.S. Cl. .............. 415/1; 415/145; 415/150; 60/232; 60/226.1; 60/771; 239/265.31; 239/265.19; 239/265.25

(58) Field of Classification Search .............. 415/1, 145, 415/150, 157, 159, 160, 148; 60/232, 226.1, 60/771; 239/265.31, 265.19, 265.25, 265.27
See application file for complete search history.

(56) References Cited

U.S. PATENT DOCUMENTS

| | | | | |
|---|---|---|---|---|
| 2,408,099 | A | * | 9/1946 | Sherman .................. 239/265.19 |
| 3,130,544 | A | * | 4/1964 | Penza ...................... 239/265.19 |
| 3,520,138 | A | * | 7/1970 | Fox .............................. 60/226.1 |
| 3,534,831 | A | * | 10/1970 | Nagamatsu et al. ..... 239/265.19 |
| 3,897,001 | A | | 7/1975 | Helmintoller, Jr. et al. |
| 3,972,349 | A | * | 8/1976 | Tumavicus .................... 415/145 |
| 4,679,982 | A | * | 7/1987 | Bouiller et al. ............... 415/145 |
| 4,827,713 | A | * | 5/1989 | Peterson et al. ............. 60/226.1 |
| 5,531,566 | A | * | 7/1996 | Derouet et al. .............. 415/145 |
| 6,092,987 | A | * | 7/2000 | Honda et al. ................. 415/145 |
| 7,624,581 | B2 | * | 12/2009 | Moniz ............................. 60/785 |
| 2003/0167750 | A1 | * | 9/2003 | Bornhoft et al. ............. 60/226.1 |
| 2005/0106009 | A1 | * | 5/2005 | Cummings et al. ........... 415/145 |

FOREIGN PATENT DOCUMENTS

| GB | 2 254 377 A | 10/1992 |
|---|---|---|
| JP | A 2001-050110 | 2/2001 |
| WO | WO 03/060312 A1 | 7/2003 |

* cited by examiner

*Primary Examiner* — Christopher Verdier

(74) *Attorney, Agent, or Firm* — Oliff & Berridge, PLC

(57) ABSTRACT

A gas turbine engine includes a fan, a bypass duct having a nozzle, through which fluid from the fan flows, and a variable area nozzle device located in the nozzle. The variable area nozzle device has an arcuate fairing having one end in slidable cooperation with the bypass duct. In a deployed position the area of the nozzle is reduced from that when stowed, thereby improving engine operability and efficiency.

15 Claims, 3 Drawing Sheets

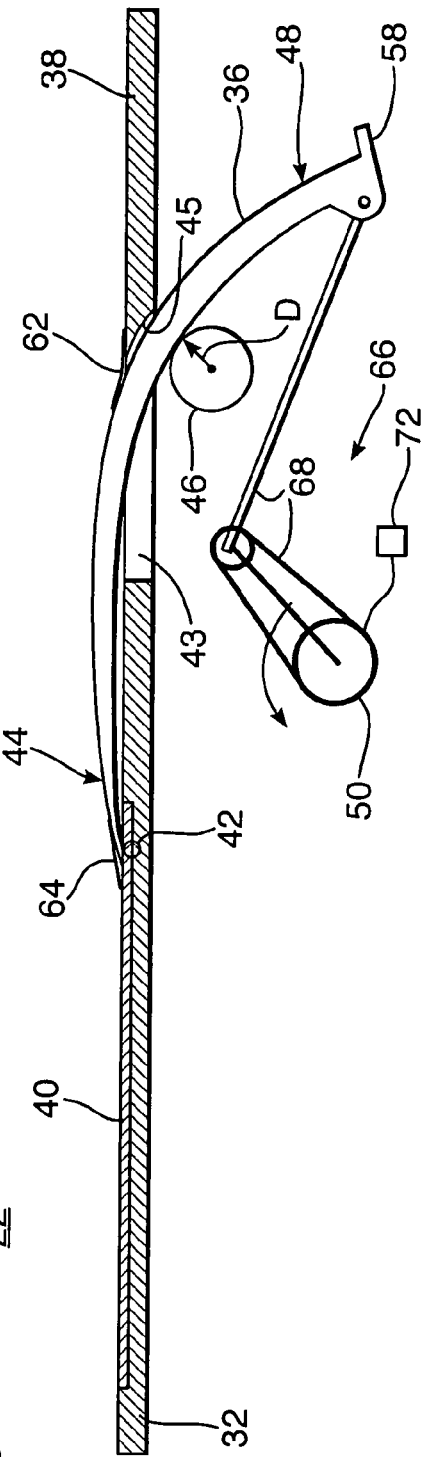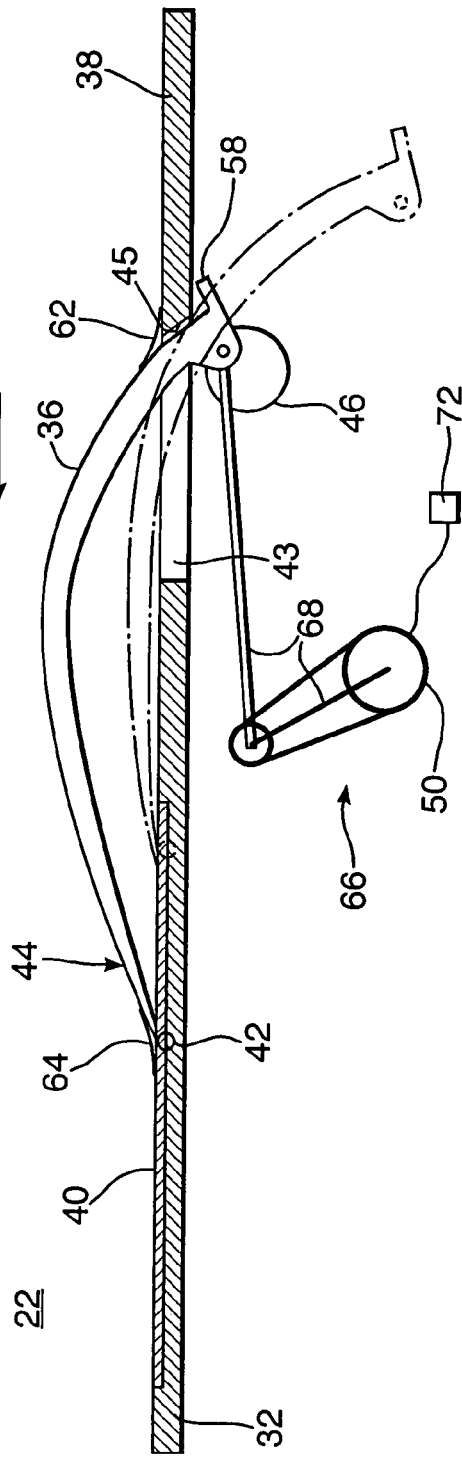

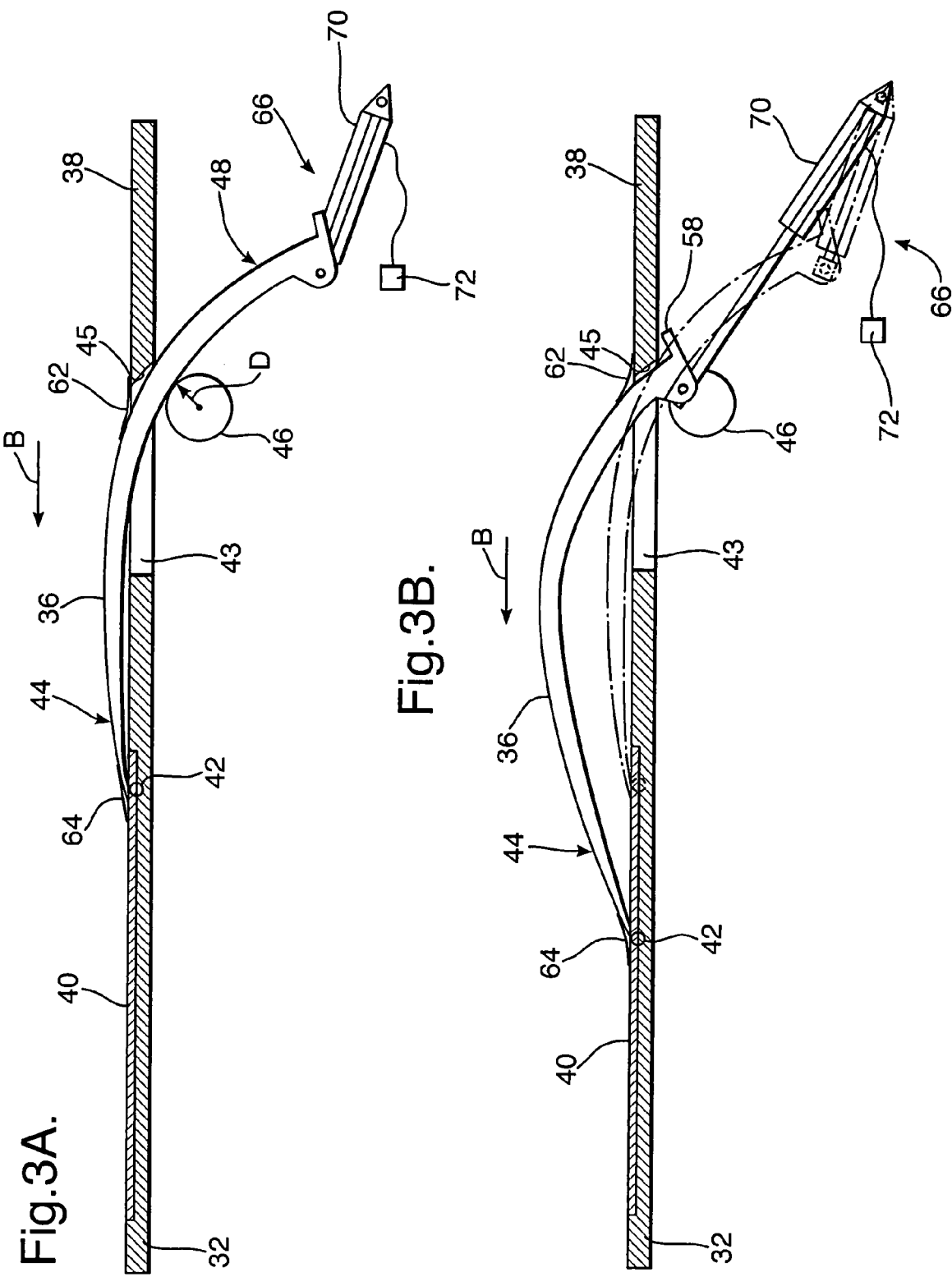

AEROENGINE NOZZLE

The present invention relates to a variable area nozzle (VAN) for a gas turbine engine.

It is desirable to vary a throat area of a fan or bypass nozzle to control fan working lines a) to improve engine operability, b) to reduce jet plume shock noise particularly in cruise configuration and c) to reduce community noise at takeoff. Furthermore, significant specific fuel consumption savings may be obtained through control of nozzle area at cruise. Usually it is preferable to reduce the nozzle area between take-off and cruise because of the relative velocities of the exhaust jet plumes and ambient i.e. as aircraft velocity increases relative to ambient the jet plume velocity relative to ambient decreases. A variable area nozzle that reduces the nozzle's area intrinsically increases jet plume velocity for a given mass flow. A higher than otherwise jet plume velocity at cruise is advantageous because it increases momentum of the exhausted jet plume and increases thrust to power the aircraft.

WO2003/060312A1 discloses a variable area nozzle embodied by flaps attached to the pylon within the fan nozzle. While mechanically simple the configuration of this device will cause large disturbances to the airflow downstream. As the downstream shape is not smooth there will be resultant pressure losses and aerodynamic drag when the flaps are deployed, with the additional risk of flow distortion and separation within the bypass duct. There is also the potential for aeromechanical flutter of the flap.

JP2001050110 discloses a circumferential elastic fairing covering several flexible tubes that inflate under fluid pressure to change fan nozzle throat area. However, this is not practical due to the nature of the elastic surface and the complexity of the control system necessary to maintain the aerodynamic shape once deployed. The wide range of air temperatures (−50° C. to +50° C.) encountered at the proposed location of the elastic fairing would also adversely affect the reliability of the elastic material.

Therefore it is an object of the present invention to provide a controllable and deployable mechanism for varying the area nozzle that is reliable and free from aerodynamic flutter and substantial losses.

In accordance with the present invention a gas turbine engine comprising a fan, a bypass duct having a nozzle, through which fluid from the fan flows, and a variable area nozzle device located in the nozzle and which is movable between a stowed position to a deployed position to reduce the area of the nozzle, characterised in that the variable area nozzle device comprises an arcuate fairing having one end in slidable cooperation with the bypass duct.

Preferably, in the stowed position the fairing is partly housed within a wall of the bypass duct.

Preferably, the wall is part of a bifurcation wall of the bypass duct.

Normally, the bypass duct defines an aperture through which the fairing extends, the aperture is located upstream of the slidable end of the fairing.

Alternatively, the bypass duct defines an aperture through which the fairing extends, the aperture is located downstream of the slidable end of the fairing.

Preferably, the bifurcation wall comprises a rail that engages a rail slide or wheel attached at the end.

Preferably, the VAN device comprises a deployment mechanism, the deployment mechanism comprises any one of the group including a mechanical linkage driven by a motor and a direct linear actuator.

Preferably, the deployment mechanism is electronically controllable.

Preferably, a biasing means is provided to urge the fairing against an edge of the wall.

Preferably, the VAN device comprises a seal between the fairing and wall at either their or both upstream or downstream junctions.

Normally, the fairing extends between a radially inner wall and a radially outer wall of the bypass duct.

Preferably, the fairing extends the full radial height of the duct.

Another aspect of the present invention is a method of deploying a variable area nozzle device of a gas turbine engine having a bypass duct, the method comprises the step of sliding a fairing of the device from a stowed position partly within a wall of the bypass duct.

Yet another aspect of the present invention is a method of operating a gas turbine engine having a variable area nozzle device mounted within a bypass duct, the method comprises the step of sliding a fairing of the device between a stowed position partly within a wall of the bypass duct to a deployed position where the area of the nozzle is decreased.

Preferably, a further step comprises deploying the fairing after a take-off phase of the gas turbine engine's operational flight cycle.

The present invention will be more fully described by way of example with reference to the accompanying drawings in which:

FIGS. 2A and 2B are schematic sections C-C of a first embodiment of the VAN mechanism in stowed and deployed positions respectively in accordance with the present invention;

FIGS. 3A and 3B are schematic sections C-C of a second embodiment of the VAN mechanism in stowed and deployed positions respectively in accordance with the present invention.

Figure 1:
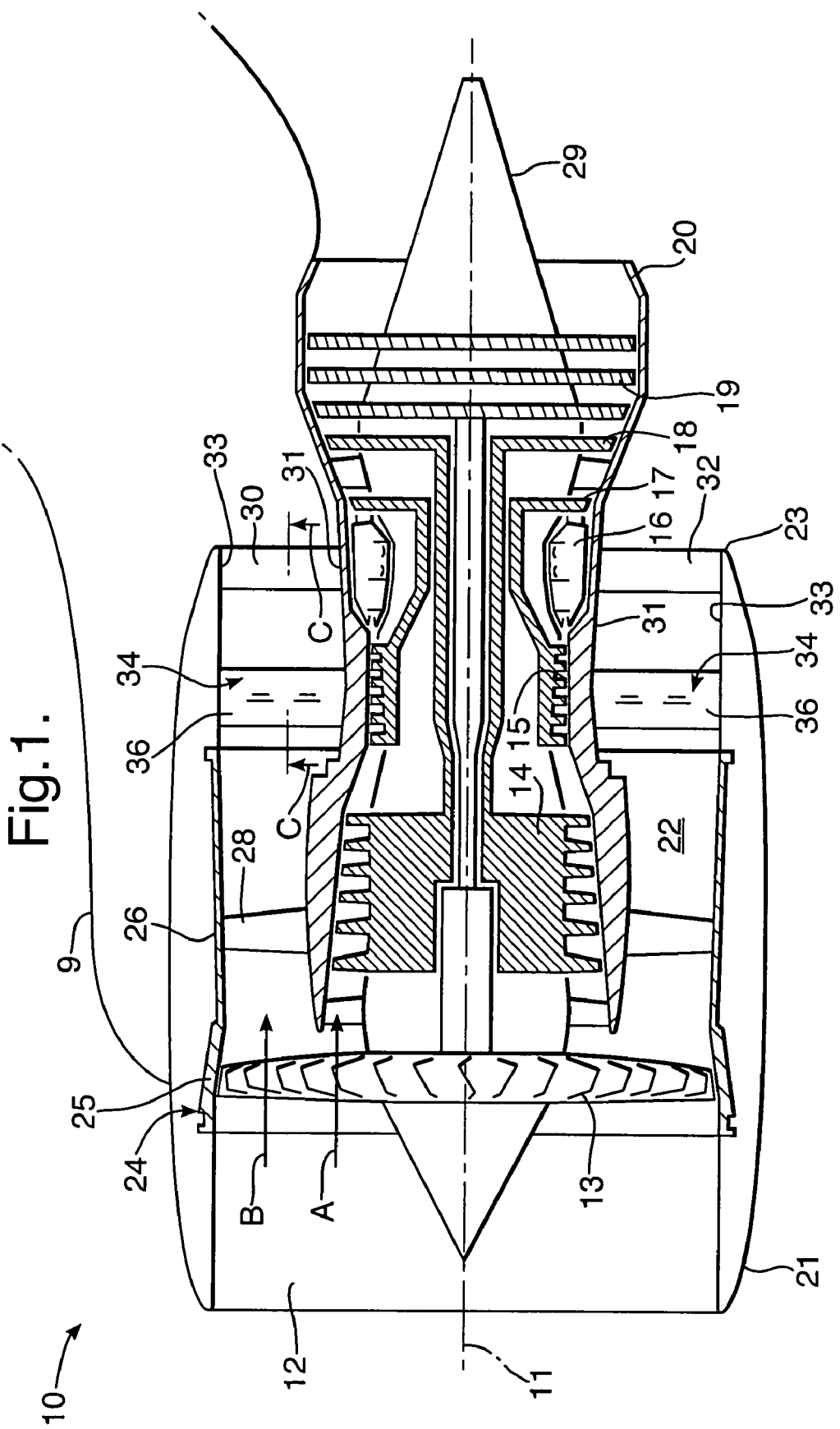
FIG. 1 is a schematic section of part of a ducted fan gas turbine engine incorporating a VAN mechanism in accordance with the present invention.

Referring to FIG. 1, a ducted fan gas turbine engine generally indicated at 10 has a principal and rotational axis 11 and is suspended from an aircraft via a pylon 9. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core exhaust nozzle 20. A nacelle 21 generally surrounds the engine 10 and defines the intake 12, a bypass duct 22 and a bypass nozzle 23. A centre-plug 29 is positioned within the core exhaust nozzle 20 to provide a form for the core gas flow to expand against and to smooth its flow from the core engine.

The gas turbine engine 10 works in the conventional manner so that air entering the intake 11 is accelerated by the fan 13 to produce two air flows: a first airflow A into the intermediate pressure compressor 14 and a second airflow B which passes through a bypass duct 22 to provide propulsive thrust. The intermediate pressure compressor 14 compresses the airflow A directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

The fan 13 is circumferentially surrounded by a structural member in the form of a fan casing 24, which is supported by an annular array of outlet guide vanes 28. The fan casing 24 comprises a rigid containment casing 25 and attached rearwardly thereto is a rear fan casing 26.

The bypass duct 22 is defined by the nacelle 21 and in this exemplary embodiment comprises two generally C-shaped ducts either side of the engine 10. The C-shaped ducts are pivotable about an attachment to the pylon 9 and are latched together at their distal edges, usually located bottom dead centre of the engine. The ducts 22 are separated by pairs of upper and lower bifurcation walls 30, 32. These bifurcation walls 30, 32 each comprise a VAN device 34 to vary the area of the nozzle 23 in accordance with the present invention.

The first embodiment of the VAN device 34, is illustrated in FIGS. 2A and 2B. The VAN device 34 comprises a translating, shaped fairing 36 that is deployable between its stowed position (FIG. 2A) and a deployed position (FIG. 2B) where it extends through an aperture 43 in the bypass wall 32 and into the bypass duct 22 reducing the bypass flow area. The fairing 36 extends the full radial height of the bypass duct 22, from a radially inner wall 31 to a radially outer wall 33 of the bypass duct 22. However, the fairing 36 may extend only a partial radial height between the radially inner and outer walls 31, 33.

The VAN device 34 comprises rails 40 mounted to the bifurcation wall 32. A rail slide or wheel 42 is attached at the downstream end 44 of the fairing 36 and engages the rail 40. Although, a slide rail is preferred and described herein it should be appreciated that any slidable and cooperating arrangement may be used suffice to say that the end 44 slides over the wall 32. In fact it is possible that no attachment as such is required as the pressure of the flow B is sufficient to urge the fairing against the wall, nonetheless the end 44 is in slidable cooperation with the wall 32.

The shape of the fairing 36 is arcuate and is such that when stowed FIG. 2A, a part of the fairing 36 is flush with the bifurcation wall's surface 38 causing minimal aerodynamic disturbance. In the stowed position the fairing 36 is partly housed within a wall 32 of the bypass duct 22. When deployed, the curve of the fairing 36 is such that the it forms a smooth "bump" on the bifurcation wall's outer surface 38, with a resultant reduction in nozzle 23 throat area.

The fairing 36 spans the radial height of the bypass duct 22 and may be recessed into the radially upper and lower parts of the bypass duct to provide a good aerodynamic seal.

As well as the rail assembly 40, 42 the fairing 36 is located by a sprung roller bearing 46, biased in the direction of arrow D and generally against the fairing 36. Actuation of the fairing 36 is via forced translation of a forward part 48 of the fairing 36. As the fairing moves between stowed and deployed positions the sprung roller bearing 46 urges the fairing 36 against an edge 45 of an upstream part of the wall 32. The sprung bias 46 is able to accommodate the change in thickness and curvature along the length of the fairing 36.

In a first embodiment, a deployment mechanism 66 comprises a mechanical linkage 68 secured to the bifurcation wall 32 and attached between part 48 and a rotary motor 50, such as an electric motor.

A second deployment mechanism 66 is shown in FIGS. 3A and 3B and comprises a direct linear actuator 70, such as a hydraulic ram. The hydraulic ram 70 may be supplied with hydraulic fluid from an independent source or from the existing engine or aircraft's hydraulic systems.

Both deployment mechanisms 66 are electronically controllable via manual selection by the aircraft crew or preferably via a control box 72 or as part of an electronic engine control (EEC) commonly present on all modern engines. Deployment of the fairing 36 is scheduled and dependent on relative aircraft velocity and/or engine operating levels. Alternatively, deployment may be dependent on pressure ratio between ambient and the bypass duct so that the working line for the fan is matched to its preferable and design criteria. Thus the fan 13 design may be further optimised without the need to accommodate an otherwise static working line. Hence gradual or partial deployment of the fairing 36 is possible during the flight cycle of the engine 10.

Mechanical end stops 58 at forward part 48 prevent over-deployment or over-stowage of the assembly as too may the rail assembly 40, 42 where the length of the rail is curtailed accordingly.

The fairing 36 may be made from various materials, but it is preferable that a stiff, lightweight structure is used. One such structure is a sandwich panel comprising two facings bonded separated by a lightweight core. Well-known carbon fibre laminate facing sheets and a polyurethane core are particularly useful. Where moderate impacts may occur a metallic facing may be more appropriate.

Further aerodynamic smoothing at the forward edge 60 of the fairing and surface 38 is made possible by attaching a sprung plate 62 (or array of plates) to an upstream part of the bifurcation wall 32. Similar air smoothing plates 64 may be attached to the rear edge 44 of the fairing 36. In this manner aerodynamic steps at the upstream and downstream edges of the fairing are minimised. It should be appreciated that further improvement is achieved where the bifurcation wall is specifically designed to accommodate the translating fairing in its stowed position.

A total of four VAN devices 34 are preferably used and positioned either side of each bifurcation wall 30, 32. The VAN devices are capable of changing the area of the nozzle by 5%, although this may vary by about 3% depending on the available bifurcation wall 32 radial height and flow areas of the bypass ducts 22.

The use of the guided curved fairing 36, as opposed to the deployed flap proposed in prior art allows a smoother reduction in throat area with minimal aerodynamic discontinuities, thereby reducing downstream pressure losses and aerodynamic loading when deployed.

As the fairing 36 is a rigid structure, it will be inherently more robust than the elastic surfaces required for prior art. The actuation system required is also substantially less complex than that of the prior art.

Although it is preferable, as described above, the fairing 36 extends through the aperture 45 which is located upstream of the slidable end 44 of the fairing, it is also possible for the aperture 45 to be located downstream of the slidable end 44. Thus in FIGS. 2A-3B the gas flow direction arrow B would simply be reversed. Of course it would be necessary to ensure an adequate seal 64 to prevent ingress of gas B into the underside of the fairing 36 and its mechanism.

It should be appreciated by the skilled artisan that the variable area nozzle device 34 may be adapted to be mounted within either or both the radially inner or outer walls 31, 33 of the bypass duct 22 or the core engine nozzle duct 20. Although the preferable direction of the sliding of end 44 relative to the wall 32 is in the downstream direction (axial) from stowed to deployed, it should be appreciated that the present invention may be adapted so that sliding occurs in either the radial or the circumferential direction or a combination of the three directions.

It will be possible for the device to be utilised during engine testing, where currently modified nozzles and blocker plates are used to vary nozzle area (and hence the fan working line) for fan flutter investigation and performance work. Such a device would allow area changes to be performed while the engine is running, a significant reduction in testing downtime is realised over current testing techniques.

The present invention also lends itself to a method of deploying a variable area nozzle device 34 and comprises the step of sliding a fairing 36 of the device 34, as hereinbefore described, from a stowed position partly within the wall 32 of the bypass duct 22.

Still further the present invention may be embodied by a method of operating a gas turbine engine 10 having the variable area nozzle device 34, described herein or otherwise, and mounted within the bypass duct 22, the method comprises the step of sliding a fairing 36 of the device 34 between a stowed position partly within a wall 32 of the bypass duct 22 to a deployed position where the area of the nozzle is decreased. Deployment of the fairing 36 occurring after take-off phase of the gas turbine engine's operational flight cycle to reduce the cross-sectional area from that at take-off.

I claim:

1. A gas turbine engine comprising:
   a fan;
   a bypass duct having a bypass flow area through which fluid from the fan flows to provide propulsive thrust, the bypass duct having a bypass wall defining an aperture; and
   a variable area nozzle device which is movable between a stowed position and a deployed position where the variable area nozzle device extends through the aperture to vary the bypass flow area, wherein the variable area nozzle device comprises an arcuate fairing having a downstream end in slidable cooperation with the bypass duct.

2. A gas turbine engine as claimed in claim 1, wherein the bypass wall is part of a bifurcation wall of the bypass duct.

3. A gas turbine engine as claimed in claim 2, wherein the bifurcation wall comprises a rail that engages a rail slide or wheel attached at one end of the arcuate fairing.

4. A gas turbine engine as claimed in claim 1, wherein the aperture is located upstream of the slidable end of the arcuate fairing.

5. A gas turbine engine as claimed in claim 4, wherein a biasing means is provided to urge the arcuate fairing against an edge of the bypass wall.

6. A gas turbine engine as claimed in claim 1, wherein the aperture is located downstream of the slidable end of the arcuate fairing.

7. A gas turbine engine as claimed in claim 1, wherein the variable area nozzle device comprises a deployment mechanism, where the deployment mechanism includes a mechanical linkage driven by a motor or a direct linear actuator.

8. A gas turbine engine as claimed in claim 7, wherein the deployment mechanism is electronically controllable.

9. A gas turbine engine as claimed in claim 1, wherein the variable area nozzle device comprises a seal between the arcuate fairing and the bypass wall at either an upstream or downstream junction, or both the upstream and downstream junction.

10. A gas turbine engine as claimed in claim 1, wherein the arcuate fairing extends between a radially inner wall and a radially outer wall of the bypass duct.

11. A gas turbine engine as claimed in claim 10, wherein the arcuate fairing extends a full radial height of the bypass duct.

12. A method of operating the gas turbine engine of claim 1, the method comprising:
   sliding the downstream end of the arcuate fairing along the bypass wall from the stowed position partly within the bypass wall to the deployed position where the area of the nozzle is decreased.

13. A method according to claim 12, further comprising:
   deploying the arcuate fairing after a take-off phase of the gas turbine engine's operational flight cycle.

14. A gas turbine engine as claimed in claim 1, further comprising a sprung roller bearing biased against the arcuate fairing, wherein the sprung roller bearing urges the arcuate fairing against an edge of an upstream part of the wall.

15. The gas turbine engine as claimed in claim 1, wherein
   a portion of the variable area nozzle in the stowed position is not exposed to airflow, and
   the arcuate fairing is an elongated substantially concave fairing having a downstream end that slides along the bypass duct in a direction substantially parallel to the airflow.

* * * * *